United States Patent
Kim et al.

(10) Patent No.: US 10,355,762 B2
(45) Date of Patent: Jul. 16, 2019

(54) SYSTEM AND METHOD FOR ADAPTIVE BEAMFORMING COMMUNICATION

(71) Applicant: Mitsubishi Electric Research Laboratories, Inc., Cambridge, MA (US)

(72) Inventors: Kyeong Jin Kim, Lexington, MA (US); Philip Orlik, Cambridge, MA (US)

(73) Assignee: Mitsubishi Electric Research Laboratories, Inc, Cambridge, MA (US)

( * ) Notice: Subject to any disclaimer, the term of this patent is extended or adjusted under 35 U.S.C. 154(b) by 98 days.

(21) Appl. No.: 15/644,532

(22) Filed: Jul. 7, 2017

(65) Prior Publication Data
US 2019/0013847 A1    Jan. 10, 2019

(51) Int. Cl.
| H04B 7/06 | (2006.01) |
| H04B 17/336 | (2015.01) |
| H04B 7/0452 | (2017.01) |
| H04W 24/02 | (2009.01) |
| H04W 72/04 | (2009.01) |

(52) U.S. Cl.
CPC ......... *H04B 7/0617* (2013.01); *H04B 7/0452* (2013.01); *H04B 7/0691* (2013.01); *H04W 24/02* (2013.01); *H04W 72/046* (2013.01); *H04B 17/336* (2015.01)

(58) Field of Classification Search
CPC .......... H04B 7/02; H04B 7/04; H04B 7/0404; H04B 7/0408; H04B 7/0413; H04B 7/0452; H04B 7/06; H04B 7/0617; H04B 7/0682; H04B 7/0691; H04B 17/209; H04B 17/21; H04W 24/02; H04W 72/046

USPC ........ 375/260, 262, 265, 267, 299; 370/208, 370/210

See application file for complete search history.

(56) References Cited

U.S. PATENT DOCUMENTS

| 6,954,931 | B2 | 10/2005 | Shetty et al. | |
| 9,001,879 | B2 | 4/2015 | Maltsev et al. | |
| 2014/0126620 | A1* | 5/2014 | Maltsev | H04B 7/0695 375/227 |
| 2014/0198696 | A1* | 7/2014 | Li | H04W 52/0229 370/311 |
| 2014/0203969 | A1* | 7/2014 | Maltsev | H01Q 3/36 342/375 |
| 2014/0204846 | A1* | 7/2014 | Maltsev | H04B 7/0617 370/329 |
| 2014/0204902 | A1* | 7/2014 | Maltsev | H04W 36/0083 370/331 |
| 2014/0334564 | A1* | 11/2014 | Singh | H04B 7/0413 375/267 |

(Continued)

*Primary Examiner* — Young T Tse
(74) *Attorney, Agent, or Firm* — Gennadiy Vinokur; James McAleenan; Hironori Tsukamoto

(57) ABSTRACT

A wireless communication system includes a controller to control a plurality of antenna subarrays of a first wireless communication device to form a plurality of directional beams to communicate a beamformed diversity wireless transmission between the first wireless communication device and a set of second wireless communication devices over a plurality of communication channels. The controller assigns at least some antenna subarrays to at least some second wireless communication devices using a greedy optimization with a relaxation parameter and controls the plurality of antenna subarrays according to the assignment.

17 Claims, 10 Drawing Sheets

(56) References Cited

U.S. PATENT DOCUMENTS

2015/0311962 A1* 10/2015 Maltsev ............... H04B 7/0669
   375/267
2016/0218827 A1* 7/2016 Kim ..................... H04L 1/0054
2017/0134076 A1   5/2017 Maamari et al.
2017/0181183 A1   6/2017 Sung et al.

* cited by examiner

| Field | Size | Meaning |
|---|---|---|
| Element ID | 8 bits | |
| Length | 8 bits | |
| SNR subfield | 6 bits | SNR as measured in the first TRN-T field or at the first sector from which SxS frame is received. |
| | 6 bits | SNR as measured in the second TRN-T field or at the second sector from which SxS frame is received. |
| | ... | ... |
| | 6 bits | SNR as measured in the $N_{meas}$'th TRN-T field or at the $N_{meas}$'th sector from which SxS frame is received. |
| Channel Measurement subfield | Channel Measurement 1 | $N_{tap} \times 14$ bits | Channel measurements for the first TRN-T field |
| | Channel Measurement 2 | $N_{tap} \times 14$ bits | Channel measurements for the second TRN-T field |
| | ... | ... | ... |
| | Channel Measurement $N_{meas}$ | $N_{tap} \times 14$ bits | Channel measurements for the $N_{meas}$'th TRN-T field |
| Tap Delay subfield | Relative Tap #1 Delay | 7 bits | The delay of Tap #1 in units of Tc relative to the path with the shortest delay detected. |
| | Relative Tap #2 Delay | 7 bits | The delay of Tap #2 in units of Tc relative to the path with the shortest delay detected. |
| | ... | ... | ... |
| | Relative Tap #$N_{tap}$ Delay | 7 bits | The delay of Tap #$N_{tap}$ in units of Tc relative to the path with the shortest delay detected. |
| Sector ID subfield | Sector ID₁ | 8 bits | Sector ID for SNR₁ being obtained, or sector ID of the first detected beam. |
| | Sector ID₂ ← 409 | 8 bits | Sector ID for SNR₂ being obtained, or sector ID of the second detected beam. |
| | ... | | |
| | Sector ID$_{Nmeas}$ or Sector ID$_{Nbeam}$ | 8 bits | Sector ID for SNR$_{Nmeas}$ being obtained, or sector ID of the $N_{beam}$'th detected beam. |
| Zero pad | Zeros | Variable (0-7) | Padding to make the Channel Measurement Feedback element length a multiple of 8 bits. |

SYSTEM AND METHOD FOR ADAPTIVE BEAMFORMING COMMUNICATION

TECHNICAL FIELD

This invention relates generally to digital communications, and more particularly to beamformed diversity wireless communication.

BACKGROUND

Some wireless communication systems may communicate over the Millimeter wave (mmWave) frequency band, e.g., the 60 GHz Frequency band. A mmWave propagation has a few major distinctive features in comparison with lower frequency bands, e.g., the frequency bands of 2.4-5 GHz. For example, the mmWave propagation may have a propagation loss greater than the propagation loss in the lower frequency bands, and may have Quasi-optical propagation properties.

A mmWave communication system may use high-gain directional antennas to compensate for large path loss and/or employ beam-steering techniques. Design of appropriate antenna system and/or further signal processing may be an important aspect of mmWave communication system development.

Some wireless communication systems use multi-element phased antenna arrays for creation of a directional antenna pattern. A phased antenna array may form a directive antenna pattern or a beam, which may be steered by setting appropriate signal phases at the antenna elements.

Beamforming combines elements in a phased array in such a way that signals at particular angles experience constructive interference while others experience destructive interference. Using the beamforming, different wireless devices can exchange data via different communication channels with different subarrays of antennas. Different communication channels may have different performance metric. Accordingly, the proper assignment of different communication channels to communication among different wireless devices can increase the overall performance of wireless communication.

Currently, the assignment of different communication channels is performed using Hungarian method that iteratively tests all possible combinations of assignments to select a combination with the best total award, e.g., the best total single-to-noise ratio. The Hungarian approach creates a tree of possible combinations, each path from a root node to a leaf node includes an equal number of nodes, each node represents an assignment, i.e., each path is a combination of assignments. See, e.g., a patent document U.S. Pat. No. 9,001,879.

The Hungarian method is a combinatorial optimization that solves the assignment problem in polynomial time. However, as a number of wireless communication devices increases, the optimization bounded by the polynomial time may be inadequate for some real-time wireless communications.

SUMMARY

Some embodiments are based on recognition that complexity of the typical assignment solution depends only on the number of wireless devises to be assigned to different wireless communication channels. In those assignment solutions, the performance of the assignment remains constant regardless of the number of the assignments. However, some embodiments are based on realization that performance of the assignment of different communication channels to multiple wireless devices can be allowed to vary for different communication applications. For example, the optimality of the assignment can be balanced against the complexity of computations. In such a manner, the complexity of the assignment can be adapted to different situations.

Some embodiments are based on realization that such an adaptation of the assignment can be achieved with greedy optimization with adaptable relaxation parameter. A greedy optimization is a paradigm that follows the problem solving heuristic of making the locally optimal choice at each stage with the hope of finding a global optimum. However, the relaxation parameter applied to the greedy optimization allows to preserve at least some suboptimal choices at each stage of the greedy optimization. The number of suboptimal choices governed by the value of the relaxation parameter can vary for different application allowing to adapt the greedy optimization based on the complexity of the assignment. For example, the value of relaxation parameter can be selected based on a computational power of a controller performing the assignment and/or based on a number of the wireless devices to be assigned.

Some embodiments are based on realization that greedy optimization with adaptable relaxation parameters can be further improved by considering only possible assignments at each stage of the greedy optimization. This embodiment is based on recognition that in each combination of the assignments, if the wireless device is assigned to a wireless channel at one stage of the greedy optimization, the assignments or reassignments to the same wireless channel are not possible in subsequent stages of the greedy optimization. In such a manner, the complexity of the greedy optimization for assignment wireless channels is further reduced.

Accordingly, one embodiment discloses a wireless communication system including a controller to control a plurality of antenna subarrays of a first wireless communication device to form a plurality of directional beams to communicate a beamformed diversity wireless transmission between the first wireless communication device and a set of second wireless communication devices over a plurality of communication channels, wherein the controller assigns at least some antenna subarrays to at least some second wireless communication devices using a greedy optimization with a relaxation parameter and controls the plurality of antenna subarrays according to the assignment.

Another embodiment discloses a method for beamformed diversity wireless transmission between a first wireless communication device and a set of second wireless communication devices over a plurality of communication channels, wherein the method uses a processor coupled with stored instructions implementing the method, wherein the instructions, when executed by the processor carry out at least some steps of the method. The method includes determining an assignment combination between a plurality of antenna subarrays of the first wireless communication device and the set of second wireless communication devices using a greedy optimization with a relaxation parameter optimizing a performance metric of the beamformed diversity wireless transmission; and controlling the plurality of antenna subarrays of the first wireless communication device to form a plurality of directional beams to communicate the beamformed diversity wireless transmission between the first wireless communication device and the set of second wireless communication devices according to the assignment combination.

Yet another embodiment discloses a product including a non-transitory storage medium having stored thereon instructions that, when executed by a machine, result in: determining an assignment combination between a plurality of antenna subarrays of the first wireless communication device and the set of second wireless communication devices using a greedy optimization with a relaxation parameter optimizing a performance metric of the beamformed diversity wireless transmission; and controlling the plurality of antenna subarrays of the first wireless communication device to form a plurality of directional beams to communicate the beamformed diversity wireless transmission between the first wireless communication device and the set of second wireless communication devices according to the assignment combination.

BRIEF DESCRIPTION OF THE DRAWINGS

FIG. 4 is a schematic structure of a channel measurement feedback element, in accordance with some embodiments.

DETAILED DESCRIPTION

Figure 1:
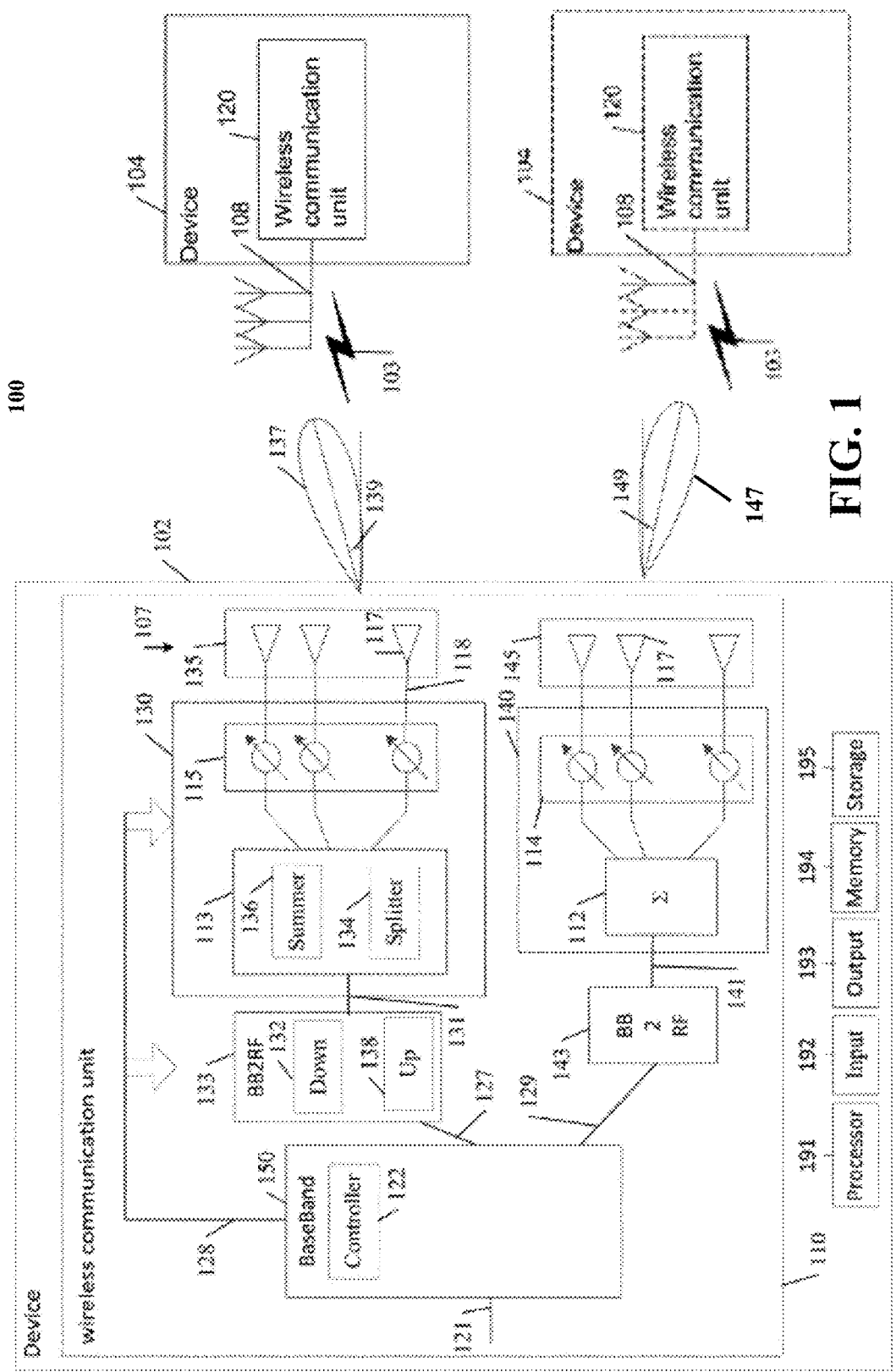
FIG. 1 is a schematic block diagram illustration of a system, in accordance with some embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "some embodiments", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, an Ultrabook™ computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11 task group ac (TGac) ("IEEE802.11-09/0308r12—TGac Channel Model Addendum Document"); IEEE 802.11 task group ad (TGad) (IEEE P802.11ad Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band)) and/or future versions and/or derivatives thereof, devices and/or networks operating in accordance with existing WirelessHD™ specifications and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some embodiments, a wireless device may be or may include a peripheral that is integrated with a computer, or a peripheral that is attached to a computer. In some embodiments, the term "wireless device" may optionally include a wireless service.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with suitable limited-range or short-range wireless communication networks, for example, a wireless area network, a "piconet", a WPAN, a WVAN and the like. Other embodiments may be used in conjunction with any other suitable wireless communication network.

Some embodiments may be used in conjunction with a wireless communication network communicating over a frequency band of 60 GHz. However, other embodiments may be implemented utilizing any other suitable wireless communication frequency bands, for example, an Extremely High Frequency (EHF) band (the millimeter wave (mm-wave) frequency band), e.g., a frequency band within the frequency band of between 30 Ghz and 300 GHZ, a WLAN frequency band, a WPAN frequency band, a frequency band according to the WGA specification, and the like.

The phrase "peer to peer (PTP or P2P) communication", as used herein, may relate to device-to-device communication over a wireless link ("peer-to-peer link") between a pair of devices. The P2P communication may include, for example, wireless communication over a direct link within a QoS basic service set (BSS), a tunneled direct-link setup (TDLS) link, a STA-to-STA communication in an independent basic service set (IBSS), or the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "mmWave frequency band" as used herein may relate to a frequency band above 30 GHz, e.g., a frequency band between 30 GHz and 300 GHz. The phrases "directional multi-gigabit (DMG)" and "directional band" (DBand), as used herein, may relate to a frequency band wherein the Channel starting frequency is above 40 GHz.

The phrases "DMG STA" and "mmWave STA (mSTA)" may relate to a STA having a radio transmitter, which is operating on a channel that is within the DMG band.

The term "beamforming", as used herein, may relate to a spatial filtering mechanism, which may be used at a transmitter and/or a receiver to improve one or more attributes, e.g., the received signal power or signal-to-noise ratio (SNR) at an intended receiver.

FIG. 1 shows a block diagram of a wireless communication system in accordance with some embodiments. In some embodiments, system 100 may form a wireless communication network including one or more wireless communication devices, e.g., wireless communication devices including a first wireless communication device 102 and a set of second wireless communication devices 104, capable of communicating content, data, information and/or signals over a wireless communication link, for example, over a radio channel, an IR channel, a RF channel, a Wireless Fidelity (WiFi) channel, and the like. One or more elements of system 100 may optionally be capable of communicating over any suitable wired communication links.

In some embodiments, devices 102 and/or 104 may include a wireless communication unit capable of communicating content, data, information and/or signals over at least one wireless communication link 103. For example, device 102 may include a wireless communication unit 110 and device 104 may include a wireless communication unit 120.

In some embodiments, wireless communication units 110 and/or 120 may include, or may be associated with, one or more antennas 107 and 108, respectively. Antennas 107 and/or 108 may include any type of antennas suitable for transmitting and/or receiving wireless communication signals, blocks, frames, transmission streams, packets, messages and/or data. For example, antennas 107 and/or 108 may include any suitable configuration, structure and/or arrangement of one or more antenna elements, components, units, assemblies and/or arrays. Antennas 107 and/or 108 may include, for example, antennas suitable for directional communication, e.g., using beamforming techniques. For example, antennas 107 and/or 108 may include a phased array antenna, a single element antenna, a set of switched beam antennas, and/or the like. In some embodiments, antennas 107 and/or 108 may implement transmit and receive functionalities using separate transmit and receive antenna elements. In some embodiments, antennas 107 and/or 108 may implement transmit and receive functionalities using common and/or integrated transmit/receive elements.

In some embodiments, wireless communication devices 102 and/or 104 may include, for example, a PC, a desktop computer, a mobile computer, a laptop computer, a notebook computer, a tablet computer, an Ultrabook™, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaining device, a data source, a data sink, a Digital Still camera (DSC), a media player, a Smartphone, a television, a music player, or the like.

Devices 102 and/or 104 may also include, for example, one or more of a processor 191, an input unit 192, an output unit 193, a memory unit 194, and a storage unit 195. Device 102 may optionally include other suitable hardware components and/or software components. In some embodiments, some or all of the components of device 102 may be enclosed in a common housing or packaging, and may be interconnected or operably associated using one or more wired or wireless links. In other embodiments, components of device 102 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some embodiments, wireless communication link 103 may include a direct link, e.g., a P2P link, for example, to enable direct communication between devices 102 and 104.

In some embodiments, wireless communication link 103 may include a wireless communication link over the mmWave band, e.g., the DMG band.

In some embodiments, wireless communication devices 102 and/or 104 may perform the functionality of mmWave STAs, e.g., DMG stations ("DMG STA"). For example, wireless communication devices 102 and/or 104 may be configured to communicate over the DMG band. In some embodiments, wireless communication link 103 may include a wireless beamformed link.

In some embodiments, wireless communication link 103 may include a wireless gigabit (WiGig) link. For example, wireless communication link 103 may include a wireless beamformed link over the 60 GHZ frequency band. In other embodiments, wireless communication link 103 may include any other suitable link and/or may utilize any other suitable wireless communication technology.

In some embodiments, antennas 107 may include at least one antenna array including a plurality of antenna elements 117. The plurality of antenna elements 117 may be configured, for example, for creation of a highly-directional antenna pattern. The plurality of antenna elements 117 may include, for example, about 16-36 antenna elements, or any other number of antenna elements, which may be placed in a predefined geometry. The plurality of antenna elements 117 may be configured to form a highly directive antenna pattern or a beam, which may be steered by setting appropriate signal phases at antenna elements 117, e.g., as described below.

In some embodiments, antennas 107 may include a plurality of antenna subarrays. For example, antennas 107 may include a first antenna subarray 135, and a second antenna subarray 145. In other embodiments, antennas 107 may include any other number of antenna subarrays, e.g., more than two antenna subarrays.

The phrase "antenna subarray" or "subarray of antennas" as used herein may relate to a group of antenna elements of the plurality of antenna elements 117, which may be coupled, for example, to a common RF chain. In one example, antennas 107 may include an antenna array, which may be divided into a plurality of, e.g., independent subarrays, each capable of independently generating a directional beam. In another example, antennas 107 may include a plurality of different antenna arrays to generate a plurality of directional beams. In another example, antennas 107 may include two or more different antenna arrays. One or more of the different antenna arrays may be divided into two or more subarrays.

In some embodiments, first antenna subarray 135 may include a first plurality of antenna elements of the plurality of antenna elements 117 configured to form a first directional beam 137 directed in a first direction 139.

In some embodiments, second antenna subarray 145 may include a second, e.g., different, plurality of antenna elements of the plurality of antenna elements 117 configured to form a second directional beam 147 directed in a second direction 149. In some embodiments, wireless communication unit 110 may include a plurality of Radio Frequency (RF) chains configured to control the first and second pluralities of antenna elements of antenna subarrays 135 and 145.

In some embodiments, the plurality of RF chains may be coupled to the plurality of antenna subarrays. For example, wireless communication unit 110 may include a first RF chain 130 connected to first antenna subarray 135, and a second RF chain 140 connected to second antenna subarray 145. In other embodiments, wireless communication unit 110 may include any other number of RF chains coupled to the any other number of the plurality of antenna subarrays, e.g., more than two RF chains connected to more than two antenna subarrays.

In some embodiments, RF chains 130 and/or 140 may include or may be included as part of a radio frequency integrated circuit (RFIC), which may be connected to antenna subarrays 135 and 145 through a plurality of feed lines 118, which may be, for example, micro-strip feed lines.

In some embodiments, the plurality of RF chains may enable processing of two or more independent RF signals, e.g., carrying different data. For example, RF chain 130 may process an RF signal 131, and RF chain 140 may process an RF signal 141.

In some embodiments, RF chain 130 may include a plurality of phase shifters 115 configured to adjust the phases of the antenna elements of antenna subarray 135. For example, a phase shifter of phase shifters 115 may be configured to adjust a corresponding antenna element of antenna subarray 135.

For example, phases of the antenna elements of antenna subarrays 135 may be shifted, e.g., by phase shifters 115, to provide a constructive and/or destructive interference, configured to change the beamforming scheme of antenna subarray 135 and to change the direction of directional beam 137.

In some embodiments, RF chain 140 may include a plurality of phase shifters 114 configured to adjust the phases of the antenna elements of antenna subarray 145. For example, a phase shifter of phase shifters 114 may be configured to adjust a corresponding antenna element of antenna subarray 145.

For example, phases of the antenna elements of antenna subarrays 145 may be shifted, e.g., by phase shifters 114, to provide a constructive and/or destructive interference, configured to change the beamforming scheme of antenna subarray 145 and to change the direction of directional beam 147.

Phase shifters 115 and/or 114 may be discrete, e.g., configured to rotate the phase of the antenna elements of antenna subarrays 135 and/or 145 to a limited set of values, for example, $0$, $\pm\pi/2$, and $\pi$, allowing only a relatively coarse beamforming for changing a direction of directional beams 137 and/or 147.

In some embodiments, RF chain 130 may include a summer/splitter block 113 coupled to phase shifters 115 and/or RF chain 140 may include a summer/splitter block 112 coupled to phase shifters 114.

In some embodiments, summer/splitter block 113 may include a splitter 134, e.g., a multiplexer, configured to reproduce and split RF signal 131 between the antenna elements of antenna subarray 135 and to couple the reproduced signals of RF signal 131 to phase shifters 115, e.g., when transmitting RF signal 131.

In some embodiments, summer/splitter block 113 may include a summer 136 configured to sum into RF signal 131 signals received from the antenna elements of antenna subarray 135, e.g., when receiving RF signal 131.

In some embodiments, utilizing two or more RF chains may enable baseband processing of two or more independent signals, e.g., carrying different data, communicated via two or more directional beams. In contrast, utilizing a single RF chain may enable baseband processing of only one signal, e.g., even if a large number of antenna elements 117 are utilized.

For example, RF chains 130 and 140 may enable baseband processing, e.g., independent baseband processing, of RF signals 131 and 141 communicated via directional beams 137 and 147.

In some embodiments, wireless communication unit 110 may utilize the two or more RF chains to perform beamformed diversity communication, e.g., as described below.

In some embodiments, wireless communication unit 110 may include a baseband 150 configured to control antenna subarrays 135 and 145 to form directional beams 137 and 147 directed to directions 139 and 149 for communicating a MIMO wireless transmission.

In some embodiments, baseband 150 may process a data stream 121 into the MIMO wireless transmission to be communicated utilizing a MIMO beamformed scheme, e.g., as described below.

Some embodiments are described herein with reference to a wireless communication unit, e.g., wireless communication unit 110, configured to perform both transmission and reception of a MIMO beamformed communication. Other embodiments may include a wireless communication unit capable of performing only one of transmission and reception of a MIMO beamformed communication.

The phrase "beamformed diversity communication", as used herein may relate to any communication utilizing a plurality of beams.

Some embodiments are described herein with reference to a communication system, e.g., wireless communication system 100, wherein both the TX side and the RX side utilize a plurality of antenna subarrays to communicate a MIMO transmission. However, other embodiments may be implemented with respect to systems configured to communicate any other diversity communication, for example, systems in which only one of the Tx and Rx sides utilizes a plurality of antenna subarrays, e.g., to form a Single-Input-Multi-Output (SIMO) and/or a Multi-Input-Single-Output (MISO) beamformed link. For example, one of the Tx and Rx sides may utilize an omni-directional antenna, and another one of the Tx and Rx sides may utilize a multi-array transceiver, e.g., wireless communication unit 110.

In some embodiments, wireless communication unit 110 may include a plurality of baseband (BB) to RF (BB2RF) converters interfacing between the plurality of RF chains and baseband 150. For example, wireless communication unit 110 may include BB2RF converters 133 interfacing between RF chain 130 and baseband 150, and BB2RF converters 143 interfacing between RF chain 140 and baseband 150. In other embodiments, wireless communication unit 110 may include any other number of BB2RF convertors connecting between baseband 150 and any other number of RF chains, e.g., more than two.

In some embodiments, BB2RF converter 133 may convert RF signal 131 into baseband data signal 127 and vice versa, and/or BB2RF converters 143 may convert RF signal 141 into baseband data signal 129 and vice versa. In one example, BB2RF converter 133 may convert RF signal 131 into baseband data signal 127, and/or BB2RF converter 143 may convert RF signal 141 into baseband data signal 129, e.g., if wireless communication unit 110 receives the MIMO wireless transmission.

In another example, BB2RF converter 133 may convert baseband data signal 127 into RF signal 131 and/or BB2RF converter 143 may convert baseband data signal 129 into RF signal 141, e.g., if wireless communication unit 110 transmits the MIMO wireless transmission.

In some embodiments, BB2RF converters 133 and/or 143 may include down-converters, configured to convert an RF signal into a baseband data signal, and to provide the baseband data signal to baseband 150, e.g., if wireless communication unit 110 receives the MIMO wireless transmission.

For example, RF chain 130 may include a down converter 132 configured to down-convert RF signal 131 into data signal 127, and to provide data signal 127 to baseband 150.

In some embodiments, baseband to RF converters 133 and/or 143 may include up-converters, configured to convert a baseband data signal into an RF signal and to provide the RF signal to an RF chain, e.g., if wireless communication unit 110 transmits the MIMO wireless transmission.

For example, RF chain 130 may include an up-converter 138 configured to up-convert data signal 127 into RF signal 131 and to provide RF signal 131 to RF chain 130.

In some embodiments, wireless communication unit 110 may be configured to perform hybrid beamforming. The hybrid beamforming may include, for example, performing a coarse beamforming in RF chains 130 and/or 140, e.g., using phase-shifters 139 and/or 149; and fine beamforming in baseband 150, e.g., as described below.

In one example, the coarse beamforming may be performed between devices 102 and 104. For example, during the coarse beamforming, device 102 may steer directional beams 137 and/or 147 to a plurality of directions, e.g., which may deliver a maximal RX signal power and/or according to any other criteria; and device 104 may have a fixed quasi-omni antenna pattern of antennas 108 to receive the transmissions from device 102. Alternatively, device 104 may adjust antennas 108 to maximize the received RX signal power, e.g., by performing a sector level sweep.

In some embodiments, the fine beamforming may include diversity processing, e.g., MIMO processing, MISO processing and/or SIMO processing, at baseband 150. For example, the MIMO processing may include, for example, closed-loop (CL) MIMO processing, Open Loop (OL) MIMO processing, Space-Block Code (SBC) MIMO processing, e.g., Space Time Block Code (STBC) MIMO processing, Space Frequency Block Code (SFBC) MIMO processing, and the like.

In some embodiments, wireless communication unit may include a controller 122 configured to control RF Chains 135 and 145 and baseband 150 to perform the coarse beamforming and/or the fine beamforming.

In some embodiments, controller 122 may control antenna subarrays 135 and/or 145 utilizing a control signal 128 carrying the amount of phase shift to be applied to one or more phase shifters of phase shifters 115 and/or 114.

In some embodiments, the phase shift adjustments to phase shifters 115 may determine and/or control the beam width, gain and/or direction of directional beam 137 formed by antenna subarray 135.

In some embodiments, the phase shift adjustments to phase shifters 114 may determine and/or control the beam width, gain and/or direction of directional beam 147 forms by antenna subarray 145.

In some embodiments, each phase shifter of an antenna element of antenna subarrays 135 and/or 145 may perform a local phase adjustment to a signal to create a local phase distribution in a desired beam direction.

In some embodiments, control signal 128 may include weighting coefficients, which may be generated and/or derived from controller 122, configured to steer directional beams 137 and/or 147.

In some embodiments, controller 122 may provide via control signal 128 a first set of weighting coefficients to phase shifters 115 configured to form a local phase adjustment to one or more antenna elements of antenna subarray 135, resulting in directing beam 137 to direction 139.

In some embodiments, controller 122 may provide via control signal 128 a second, e.g., different set of weighting coefficients, to phase shifters 114 configured to form a local phase adjustment to one or more antenna elements of antenna subarray 145, resulting in directing beam 147 to direction 149.

In some embodiments, wireless communication unit 110 may be utilized by a Transmit (TX) side and a Receive (RX) side to form a plurality of independent directional communication beams between the TX and RX sides. Accordingly, the plurality of directional beams may be utilized for using a plurality of independent paths for communicating a plurality of data streams, e.g., different data streams, thus increasing total throughput.

In some embodiments, a plurality of different signals may be communicated via a plurality of beamformed links formed by the plurality of beamformed beams. Each beamformed link, which corresponds to an antenna subarray of the plurality of antenna subarrays, may communicate a signal, for example, via a plurality of antenna elements of the antenna subarray.

For example, a first signal, e.g., signal 127, may be communicated via a first beamformed link formed by directional beam 137 generated by antenna subarray 135, and a second, e.g., different signal, for example, signal 129, may be communicated via a second beamformed link formed by directional beam 147 generated by antenna subarray 145.

In some embodiments, wireless communication unit 110 may communicate the MIMO wireless transmission via a plurality of selected independent directional, e.g., spatial, links between devices 102 and 104.

For example, wireless communication unit 110 may select the first beamformed link to communicate the MIMO wireless transmission via directional beam 137 and the second beamformed link to communicate the MIMO wireless transmission via directional beam 147.

In some embodiments, the plurality of selected directional links may be selected from a plurality of directional links between devices 102 and 104. In some embodiments, a directional link between devices 102 and 104 may be formed by a pair of a TX sector and an RX sector.

For example, device 102 may perform the functionality of the TX side and device 104 may perform the functionality of the RX side. A first TX sector of device 102 may form a first directional link with a first RX sector of device 104, a second TX sector of device 102 may form a second directional link with a second sector RX of device 104, a third TX sector of device 102 may form a third directional link with a third RX sector of device 104, and/or another TX sector of device 102 may form another directional link with another RX sector of device 104.

In some embodiments, controller 122 may determine the plurality of directional links during an establishment of wireless communication link 103, for example, during a TX and/or RX sector scan between devices 102 and 104.

For example, during the TX and RX sector scan, device 102 may detect the plurality of directional links, for example, according to a beamforming training procedure.

Figure 2:
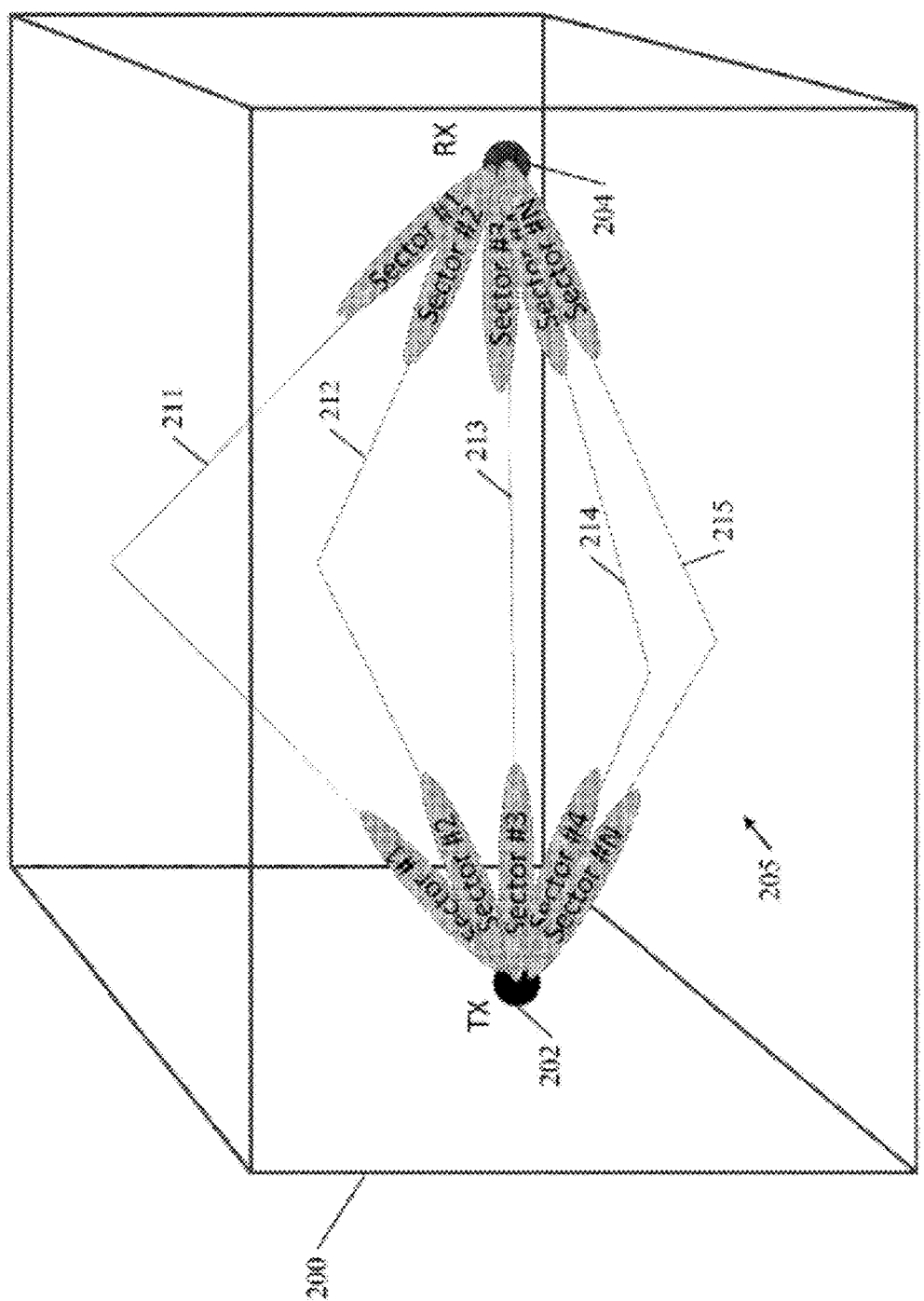
FIG. 2 is a schematic illustration of a plurality of directional links, in accordance with some embodiments.

FIG. 2 is a schematic of a plurality of directional links 205 between a TX side 202 and an RX side 204 in an environment 200, in accordance with some embodiments. For example, device 102 (FIG. 1) may perform the functionality of TX side 202, and/or device 104 (FIG. 1) may perform the functionality of RX side 204.

For example, environment 200 may include a room, RX side 204 may include a receiver, e.g., a Television (TV) receiver, positioned on a wall of the room, and/or TX side 202 may include a transmitter, e.g., a video player. Additionally, or alternatively, the environment 200 can include an open space with structures, like building reflecting the transmitted signals. In this example, the RX side 204 may include a receiver, e.g., a mobile device like a smartphone, and/or TX side 202 may include a transmitter, e.g., a base stating enabling the communications of the mobile devices.

As shown in FIG. 2, the plurality of directional links 205 may include N links, e.g., including links 211, 212, 213, 214 and 215, between TX side 202 and RX side 204. For example, a sector, denoted sector #1, of TX side 202 may form directional link 211 with a sector, denoted sector #1, of RX side 204; a sector, denoted sector #2, of TX side 202 may form directional link 212 with a sector, denoted sector #2, of RX side 204; a sector, denoted sector #3, of TX side 202 may form directional link 213 with a sector, denoted sector #3, of RX side 204; a sector, denoted sector #4, of TX side 202 may form directional link 215 with a sector, denoted sector #4, of RX side 204; and/or a sector, denoted sector #N, of TX side 202 may form directional link 215 with a sector, denoted sector #N, of RX side 204.

In some embodiments, directional links 205 may be determined during a sector scan performed between TX side 202 and RX side 204, e.g., according to the WGA Specifications or any other Specification.

Referring back to FIG. 1, in some embodiments, diversity processing techniques, e.g., the MIMO processing techniques may require reliable algorithms for selection and/or tracking of two or more directional links.

In some embodiments, controller 122 may be configured to select the plurality of directional links for performing the beamformed diversity communication.

In one example, controller 122 may select directional links 212 and 213 (FIG. 2) for performing the MIMO communication. In another example, controller 122 may select any other directional links of the N directional links 205 (FIG. 2) for performing the MIMO communication.

In some embodiments, controller 122 may perform a MIMO final beam combining procedure configured to select two or more directional links, for example, to be formed by two or more pairs of sectors, e.g., an RX sector and a TX sector. For example, wireless communication unit 110 may select more than one pair of TX and RX sectors.

In some embodiments, controller 122 may select the selected directional links from a plurality of available links, e.g., the N directional links 205 (FIG. 2), based on at least one predefined selected criterion.

In some embodiments, the selection criterion may be configured to relate to one or more predefined properties of wireless communication link 103, e.g., as described below.

In some embodiments, controller 122 may select the plurality of directional links, which may provide significant signal power at the RX side.

In some embodiments, controller 122 may select the plurality of directional links, which may be mutually uncorrelated, for example, such that each directional link may be required to come from a different direction, be reflected from different objects, have a different angle of arrival and/or departure, and the like. For example, controller 122 may select directional links, e.g., directional links 211 and 215 (FIG. 2), which are coining from different directions, for example, directional link 211 (FIG. 2) is reflected from a ceiling of environment 200 (FIG. 2) and directional link 215 is reflected from a floor of environment 200 (FIG. 2).

In some embodiments, the number of the selected directional links may be equal to or greater than the smallest of the number of TX and RX RF chains of the TX and RX sides, and equal to or lesser than the greatest of the number of TX and RX RF chains of the TX and RX sides.

In one example, the number of the selected directional links may be equal to or greater than one and equal to or lesser than two, e.g., if device 102 includes two RF chains, e.g., RF chains 130 and 140, and device 104 includes a single RF chain. Accordingly, the beamformed diversity communication may include a MISO or SIMO communication.

In another example, the number of the selected directional links may be equal to or greater than two and equal to or lesser than four, e.g., if device 102 includes two RF chains, e.g., RF chains 130 and 140, and device 104 includes four RF chains. Accordingly, the beamformed diversity communication may include a MIMO communication.

In some embodiments, controller 122 may select the selected directional links based on at least one predefined performance metric.

In some embodiments, controller 122 may control the plurality of antenna subarrays to form the plurality of directional beams for communicating the MIMO wireless transmission over the plurality of selected directional links.

In some embodiments, controller 122 may control antenna subarrays 135 and/or 145 based on the directions of the selected plurality of directional links.

In one example, controller 122 may select directional beams 213 and 215 (FIG. 2) of the N directional beams 205 (FIG. 2) based on the predefined performance metric. Controller 122 may control antenna subarray 135 to form directional beam 137 directed in direction 139, which is directed to a direction of directional link 213 (FIG. 2), and antenna subarray 145 to form directional beam 147 directed in direction 149, which is directed to a direction of directional link 214 (FIG. 2), for communicating the MIMO wireless transmission over directional links 213 and 214 (FIG. 2).

For example, controller 122 may control antenna subarray 135 to steer directional beam 137 to a direction of directional link 213 (FIG. 2), e.g., if directional link 213 (FIG. 2) is selected for communicating the MIMO wireless transmission, and controller 122 may control antenna subarray 145 to steer directional beam 147 to a direction of directional link 214 (FIG. 2), e.g., if directional link 214 (FIG. 2) is selected for communicating the MIMO wireless transmission.

Additionally, or alternatively, the controller 122 enables multi-user communications between the first device 102 and the set of second devices 104, e.g., using the beamforming. For example, if multiple devices 104 communicate with the same antennas subarray, e.g., the subarray 135, collision can occur. To that end, some embodiments perform an assignment of different subarrays of antennas of the first device with different second devices.

In some embodiments, the controller 122 controls a plurality of antenna subarrays of a first wireless communication device to form a plurality of directional beams to communicate a beamformed diversity wireless transmission between the first wireless communication device and a set of second wireless communication devices over a plurality of communication channels. The controller 122 assigns at least some antenna subarrays to at least some second wireless communication devices using a greedy optimization with a relaxation parameter and controls the plurality of antenna subarrays according to the assignment.

In some embodiment the assignment, i.e., an assignment combination between different subarrays of antennas of the first device with different second devices, is performed to optimize improve a metric of performance of multi-user communication. In different embodiments, the performance metric includes one or combination of a channel capacity metric, a signal-to-noise (SNR) value for each communication channel in the assignment combination, a signal-to-interference-plus-noise-ratio (SINR) value for each communication channel in the assignment combination.

In some embodiments, the performance metric may include a channel capacity metric, e.g., as described below. In some embodiments, controller 122 may determine the performance metric with respect to a particular directional link based on a channel matrix corresponding to the particular link and a number of transmit antenna arrays, e.g., as described below. In one embodiment, a MIMO channel capacity metric may be defined, for example, to increase, e.g., maximize, system throughput.

In one example, the channel capacity metric may be determined with respect to a directional link, e.g., as follows:

$$C = \log_2 \det\left[I + \frac{H(H)^H}{\sigma^2 Nt}\right] \quad (1)$$

wherein C denotes the channel capacity metric corresponding to the directional link, $\sigma^2$ denotes an additive noise power, H denotes a channel matrix corresponding to the directional link, I denotes the identity matrix, and Nt denotes the number of transmit antenna subarrays, $(.)^H$ denotes the Hermitian matrix operation.

For example, the dimensions of the matrix H may be based on the number of RF chains in the TX side and RX side.

In some embodiments, elements of the channel matrix H may be obtained, for example, by channel measurements for combinations, e.g., every combination, of TX side and RX side sector pairs. The channel capacity metric C may be determined, e.g., according to Equation 1, with respect to each sector pair. Two or more pairs, e.g., the pairs, which maximize the channel capacity metric C, may be selected for multi-beam MIMO communication.

For example, controller 122 may determine the channel capacity metric C for each of the N directional links 205 (FIG. 2), e.g., based on Equation 1. For example, the matrix H may include a channel matrix of a directional link of N directional links 205 (FIG. 2), and the number Nt may be equal to two, e.g., if two transmit antenna subarrays, e.g., antenna subarrays 135 and 145, are used.

In some embodiments, controller 122 may determine the performance metric with respect to a particular directional link based on a combination of a plurality of Signal-to-Interference-plus-noise-ratio (SINR) values corresponding to a plurality of received diversity streams, for example, MIMO streams, of the particular directional link, e.g., as described below.

In one example, a specific MIMO receiver scheme may be assumed for selection of the optimal combination of directional links. For example, in case of a minimum mean square error (MMSE) receiver scheme, the SINR for a k-th directional link may be calculated, e.g., as follows:

$$SINR_k = \frac{1}{\left\{\left(\frac{(H)^H H}{\sigma^2} + I\right)^{-1}\right\}_{k,k}} - 1 \quad (2)$$

wherein $\{A\}_{k,k}$ denotes the (k,k)th element of a matrix A.

The SINR per the directional link may be utilized, for example, to compute the performance metric per a total system throughput, e.g., as follows:

$$C = \sum_k \log_2(1 + SINR_k) \quad (3)$$

For example, the SINR for each one of the N directional links 205 (FIG. 2) may be calculated. Controller 122 may select two directional links, e.g., directional links 211 and 213 (FIG. 2), providing the maximal performance metric C according to Equation 3.

In some embodiments, controller 122 may determine an SINR value of the SINR values based on an effective channel after performing Space-Block-Code processing, e.g., as described below.

In some embodiments, the matrix H defining the channel between the TX and RX sector pair may also account for additional space-time processing, e.g., the MIMO scheme, which may be performed at the transmitter and/or receiver, e.g., in baseband 150. In one example, baseband 150 may perform space-time block coding processing of the MIMO wireless transmission.

In one example, the channel matrix H may be considered as an effective channel after performing the space-time block coding in baseband 150. For example, if utilizing an Alamouti coding scheme, the SINR for the throughput calculation described above may be obtained, e.g., as follows:

$$SINR = \frac{\text{trace}((H)^H H)}{\sigma^2} \quad (4)$$

wherein trace (A) denotes trace operation of a matrix A.

In some embodiments, the performance metric may be defined, for example, to improve system robustness. In some embodiments, the performance metric may be based on differences in angles of arrival and/or differences in angles of departure, e.g., as described below.

In one example, sectors with maximal differences in angles of arrival, e.g., at the RX side, and/or angles of departure, e.g., at the TX side, may be selected for communication, e.g., to overcome possible ray blockage, e.g., human blockage.

For example, controller 122 may select directional beams 211 and 215 (FIG. 2) for communicating the MIMO wireless communication, e.g., since a difference in angles of departure and angles of arrival between directional beams 211 and 215 (FIG. 2) is maximal with respect to other combination of directional links of the N directional links 205 (FIG. 2).

In some embodiments, controller 122 may utilize any other intelligent algorithms to support a robust mode, such as discovery and usage of directional links reflected from the room ceiling, e.g., directional link 211 (FIG. 2).

In some embodiments, increases the total rate of data transmission. A rate of transmission between a the first and the second devices is defined by $R_u = \log_2 (1+SNR_u)$, where $SNR_u$ is the effective signal-to-noise ratio for the second device u. For $N_U$ users in the system, the total rate of transmission is given by $$R = \Sigma_{u=1}^{N_U} R_u.$$

To find the optimum assignment to N subarrays, some embodiments use combinatorial combinations.

In other embodiments, any other suitable performance metric may be defined. For example, instead of a logarithm function, a mutual information function for the specific modulation scheme, e.g., that meets target packet error rate requirements, may be utilized in the selection of the optimal combination of directional links.

In some embodiments, wireless communication unit 110 may use one or more feedback mechanisms to communicate information ("beam selection information") between the TX and RX sides, e.g., to support the beam selection procedures described herein. For example, wireless communication unit 110 may communicate with device 104 the beam selection information to support the selection of the directional links.

In some embodiments, the beam selection information may be communicated as part of a channel measurement feedback element. In one example, the beam selection information may be communicated as part of one or more dedicated fields of a channel measurement feedback element, e.g., as described below.

In some embodiments, the channel measurement feedback element may be transmitted by a STA, e.g., the Tx side or the Rx side. The channel measurement feedback element may be transmitted by the STA, e.g., in response to a beam refinement packet containing a channel measurement request.

In some embodiments, the channel measurement feedback element may include a plurality of measurements corresponding to a plurality of sector identifiers.

For example, the channel measurement feedback may include a first sector identifier identifying a first sector of an antenna subarray, and a plurality of measurements corresponding to the first sector.

In some embodiments, the channel measurement feedback element may include the channel measurement feedback data measured with respect to the channel measurement request. For example, the channel measurement feedback element may represent measurement feedback data, which may be measured on TRN-T fields of a Beam Refinement packet that includes the channel measurement request.

In some embodiments, the channel measurement feedback element may provide, for example, a list of sectors identified by wireless communication unit 110 during a sector scan. The format and size of the channel measurement feedback element may be defined by parameter values specified in an accompanying beam refinement element.

In some embodiments, an information element of the channel measurement feedback element may be used to provide the SINR and/or channel taps, e.g., channel impulse response, for a set of selected sectors.

In some embodiments, the channel measurement feedback element may be configured to provide information about the particular antenna subarrays, in which measurements are performed.

In some embodiments, a new field may be added to information elements, which may be communicated during the measurements, specifying the particular antenna subarray for which measurements are performed, e.g., as described below.

For example, a beam refinement element, e.g., DMG Beam Refinement element, may include a field, e.g., an "array index" field, to include an identifier of the particular antenna subarray for which information about the antenna subarray is provided, for example, if the device has more than one antenna subarray, e.g., as described below with reference to FIG. 3.

Figure 3:
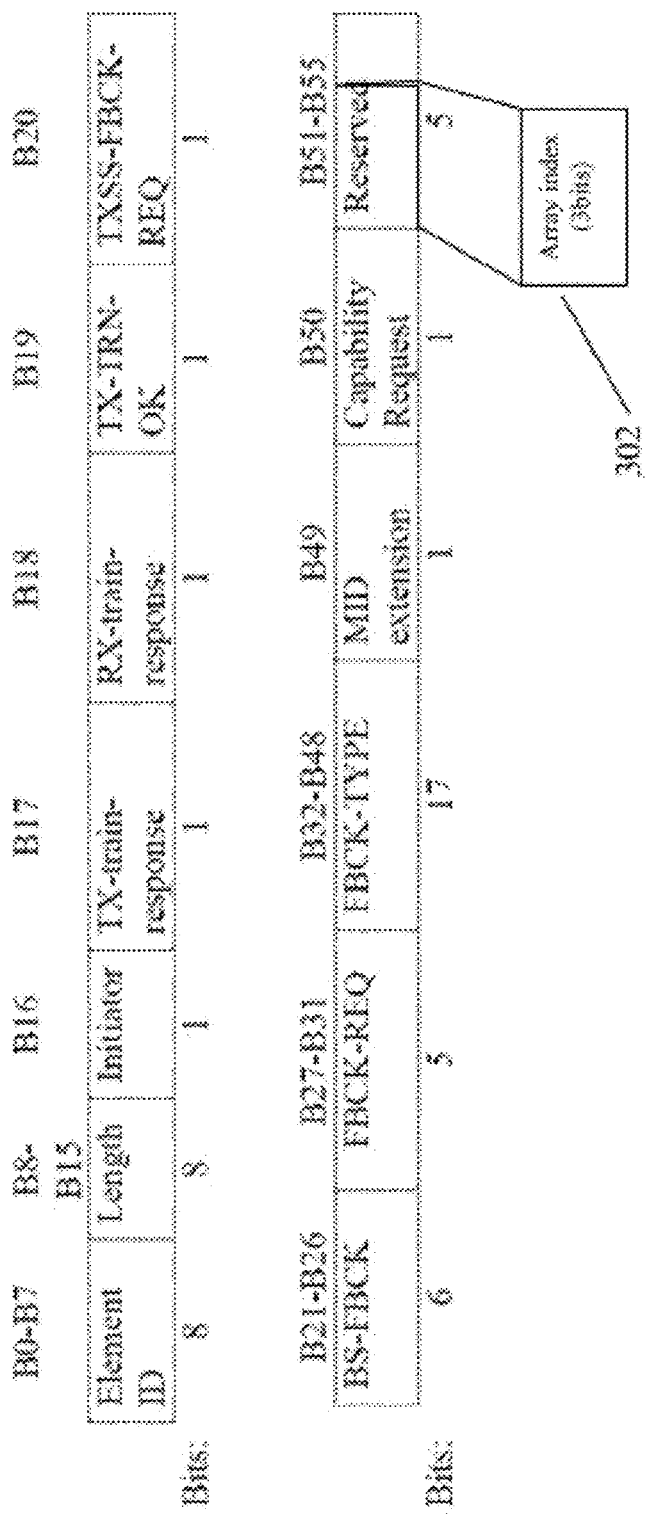
FIG. 3 is a schematic illustration of a structure of a beam refinement element, in accordance with some embodiments.

Reference is made to FIG. 3, which schematically illustrates a beam refinement element 300, in accordance with some embodiments.

In some embodiments, wireless communication unit 110 (FIG. 1) may communicate beam refinement element 300 to device 104 (FIG. 1).

As shown in FIG. 3, beam refinement element 300 may include a reserved field 302, e.g., including three bits or any other number of bits. Reserved field 302 may include an identifier of an antenna subarray for which information about the antenna subarray is provided in beam refinement element 300.

As shown in FIG. 3, the identifier may be of a size of three bits, e.g., capable of representing up to eight antenna subarrays in binary notation. For example, antenna subarray 135 (FIG. 1) may be represented by the binary notation "001", and antenna subarray 145 (FIG. 1) may be represented by the binary notation "010", or any other notation.

Referring back to FIG. 1, in some embodiments, wireless communication unit 110 may communicate a channel measurement feedback element including an identifier of a particular antenna subarray, and one or more measurements corresponding to the particular antenna subarray.

For example, wireless communication unit 110 may communicate the channel measurement feedback element, e.g., beam refinement element 300 (FIG. 3), in response to a channel measurement request transmitted from device 104. The channel measurement feedback element may include an identifier, e.g., in field 302 (FIG. 3), of an antenna subarray, e.g., antenna subarray 135 and/or 145, and one or more measurements corresponding to the antenna subarray identified by field 302 (FIG. 3).

In another embodiment, the enumeration and meaning of a "sector" may be extended, e.g., redefined, such that the sector number simultaneously identifies the sector index and antenna subarray index. For example, sectors 1-64 may be defined to correspond to antenna subarray 135 (FIG. 1), sectors 65-128 may be defined to correspond to antenna subarray 145 (FIG. 1), and the like.

In some embodiments, the extended definition of the sector may require an increased number of bits for identifying a sector, e.g., eight bits to enable identifying sectors of up to 256 subarrays. For example, a Channel Measurement Feedback element may include an ID beam field of a size of up to eight bits.

Reference is now made to FIG. 4, which schematically illustrates a channel measurement feedback element 400, in accordance with some embodiments.

In some embodiments, wireless communication unit 110 (FIG. 1) may communicate channel measurement feedback element 400, e.g., in response to a channel measurement request transmitted from device 104 (FIG. 1).

As shown in FIG. 4, channel measurement feedback element 400 may include subfields, e.g., subfields 402, 404, 406 and/or 408, including information elements of the channel measurement feedback element 400.

As shown in FIG. 4, subfield 402 may provide the SINR measured on the TRN-T fields, subfield 404 may provide the channel measurement, measured on the TRN-T fields, subfield 406 may provide the TAP delay of the sectors, and subfield 408 may include identifier of a sector ID to which the information of subfields 402, 404 and 406 relates.

In some embodiments, subfield 408 may be defined, such that the sector number simultaneously identifies the sector index and antenna array index, e.g., as described above with reference to the ID beam field. Accordingly, a size 409 of a sector ID field may be increased from six bits to eight bits.

Referring back to FIG. 1, in some embodiments, wireless communication unit 110 may communicate the channel measurement feedback element, in response to a channel measurement request transmitted from device 104. The channel measurement feedback element may include a plurality of sector identifiers, each sector identifier identifying a particular antenna subarray and a particular sector corresponding to the particular antenna subarray. Fields 402, 404 and/or 406 (FIG. 4) may include measurements performed with respect to the sectors of subarray 135 and 145 identified in subfield 408 (FIG. 4).

For example, wireless communication unit 110 may communicate the channel measurement feedback element including a first plurality of sector identifiers, for example, a first portion of subfield 408 (FIG. 4), identifying one or more sectors of antenna subarray 135, e.g., a first sector identifier identifying a first sector of antenna subarray 135, a second sector identifier identifying a second sector of antenna subarray 135 and one or more sector identifiers identifying one or more additional sectors of antenna subarray 135; and a second plurality of sector identifiers, for example, a second portion of subfield 408 (FIG. 4), identifying one or more sectors of antenna subarray 145, e.g., a first sector identifier identifying a first sector of antenna subarray 145, a second sector identifier identifying a second sector of antenna subarray 145 and one or more sector identifiers identifying one or more additional sectors of antenna subarray 145. Fields 402, 404 and/or 406 (FIG. 4) may include measurements performed with respect to the sectors of subarray 135 and 145 identified in subfield 408 (FIG. 4).

In some embodiments, flexible division of a large multi-element antenna array into several subarrays may be performed. To support such flexible subarray configurations, the information about the used configuration and about the number of antenna elements in each subarray may also be included in the feedback, e.g. in a separate information element.

Figure 5:
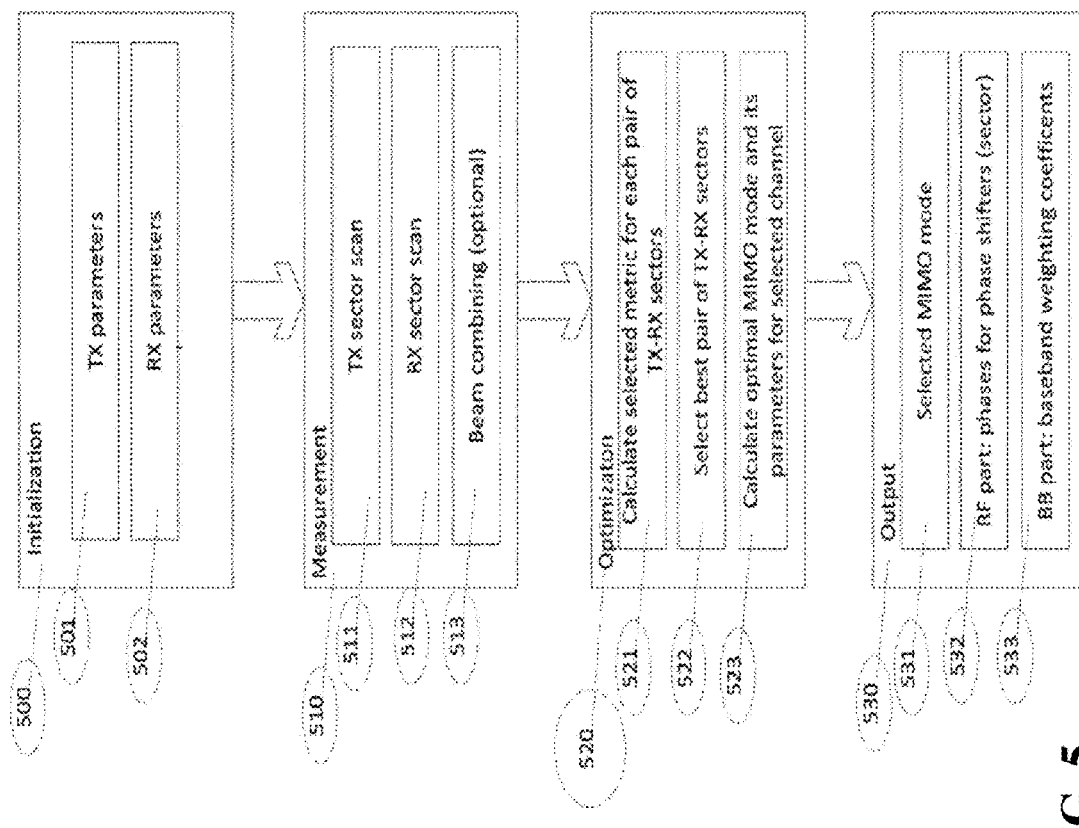
FIG. 5 is a schematic flow-chart illustration of a method of beam selection for multi-beam beamformed communication, in accordance with some embodiments.

Reference is made to FIG. 5, which schematically illustrates a method of beam selection for MIMO beamformed communication, in accordance with some embodiments. In some embodiments, one or more of the operations of the method of FIG. 5 may be performed by a wireless communication system, e.g., system 100 (FIG. 1); a wireless communication device, e.g., device 102 (FIG. 1); a baseband, e.g., baseband 150 (FIG. 1); a controller, e.g., controller 122 (FIG. 1), and/or a wireless communication unit, e.g., wireless communication units 110 and or 120 (FIG. 1).

As indicated at block 500, the method may include initializing TX and RX parameters. For example, wireless communication unit 110 (FIG. 1) may initialize TX and RX parameters of devices 102 and/or 104 (FIG. 1).

As indicated at block 501, initializing the TX parameters may include initializing TX parameters. For example, wireless communication unit 110 (FIG. 1) may obtain a number of antenna subarrays of device 102 (FIG. 1) and a set of sectors of device 102 (FIG. 1) to perform sector scanning, e.g., as described above.

As indicated at block 502, initializing the RX parameters may include initializing RX parameters. For example, wireless communication unit 110 (FIG. 1) may obtain a number of antenna subarrays of device 104 (FIG. 1) and a set of sectors of device 104 (FIG. 1) to perform sector scanning, e.g., as described above.

As indicated at block 510, the method may include measuring beamforming parameters. For example, wireless communication unit 110 (FIG. 1) may measure beamforming parameters of a plurality of directional links between devices 102 (FIG. 1) and 104 (FIG. 1), e.g., as described above.

As indicated at block 511, measuring the beamforming parameters may include performing a TX sector scan. For example, wireless communication unit 110 (FIG. 1) may perform a TX sector scan to detect the plurality of directional links, e.g., as described above.

As indicated at block 512, measuring the beamforming parameters may include performing an RX sector scan. For example, wireless communication unit 120 (FIG. 1) may perform an RX sector scan to detect the plurality of the directional links, e.g., as described above.

As indicated at block 513, measuring the beamforming parameters may include performing TX-RX beam combining. For example, wireless communication unit 110 (FIG. 1) may perform TX-RX beam combining, e.g., as described above.

In some embodiments, the TX-RX combining may provide a plurality of pairs of the TX-RX sectors, with measured channel impulse response for each pair.

As indicated at block 520, the method may include determining a MIMO beamformed scheme. For example, controller 122 (FIG. 1) may determine the MIMO beamformed scheme for communicating between devices 102 and 104 (FIG. 1), e.g., as described above.

As indicated at block 521, determining the MIMO beamformed scheme may include calculating a performance metric for each pair of TX-RX sectors. For example, controller 122 (FIG. 1) may calculate the performance metric, e.g., the performance metric C, for each pair of the N directional links 205 (FIG. 2), e.g., as described above.

As indicated at block 522, determining the MIMO beamformed scheme may include selecting a pair of directional links. For example, controller 122 (FIG. 1) may select directional beams 211 and 215 (FIG. 2) based on the performance metric, e.g., as described above.

As indicated at block 523, determining the MIMO beamformed scheme may include calculating an optimal MIMO mode and parameters for the selected directional links. For example, controller 122 (FIG. 1) may calculate the weighting coefficients to be applied at baseband and/or RF processing, e.g., as described above.

As indicated at block 530, the method may include configuring the MIMO beamformed scheme. For example, controller 122 (FIG. 1) may configure the MIMO beamformed scheme of wireless communication unit 110 (FIG. 1), e.g., as described above.

As indicated at block 531, configuring the MIMO beamformed scheme may include selecting a MIMO mode. For example, controller 122 (FIG. 1) may select the MIMO processing mode at baseband 150, e.g., OL, CL, SBC and the like, e.g., as described above.

As indicated at block 532, configuring the MIMO beamformed scheme may include determining phases for the phase shifters for RF processing. For example, controller 122 (FIG. 1) may determine phases to be applied by phase shifters 115 and/or 114 (FIG. 1), e.g., as described above.

As indicated at block 533, configuring the MIMO beamformed scheme may include determining baseband weighting coefficients for baseband MIMO processing. For example, controller 122 (FIG. 1) may determine weighting coefficients for MIMO processing at baseband 150 (FIG. 1), e.g., as described above.

Figure 6:
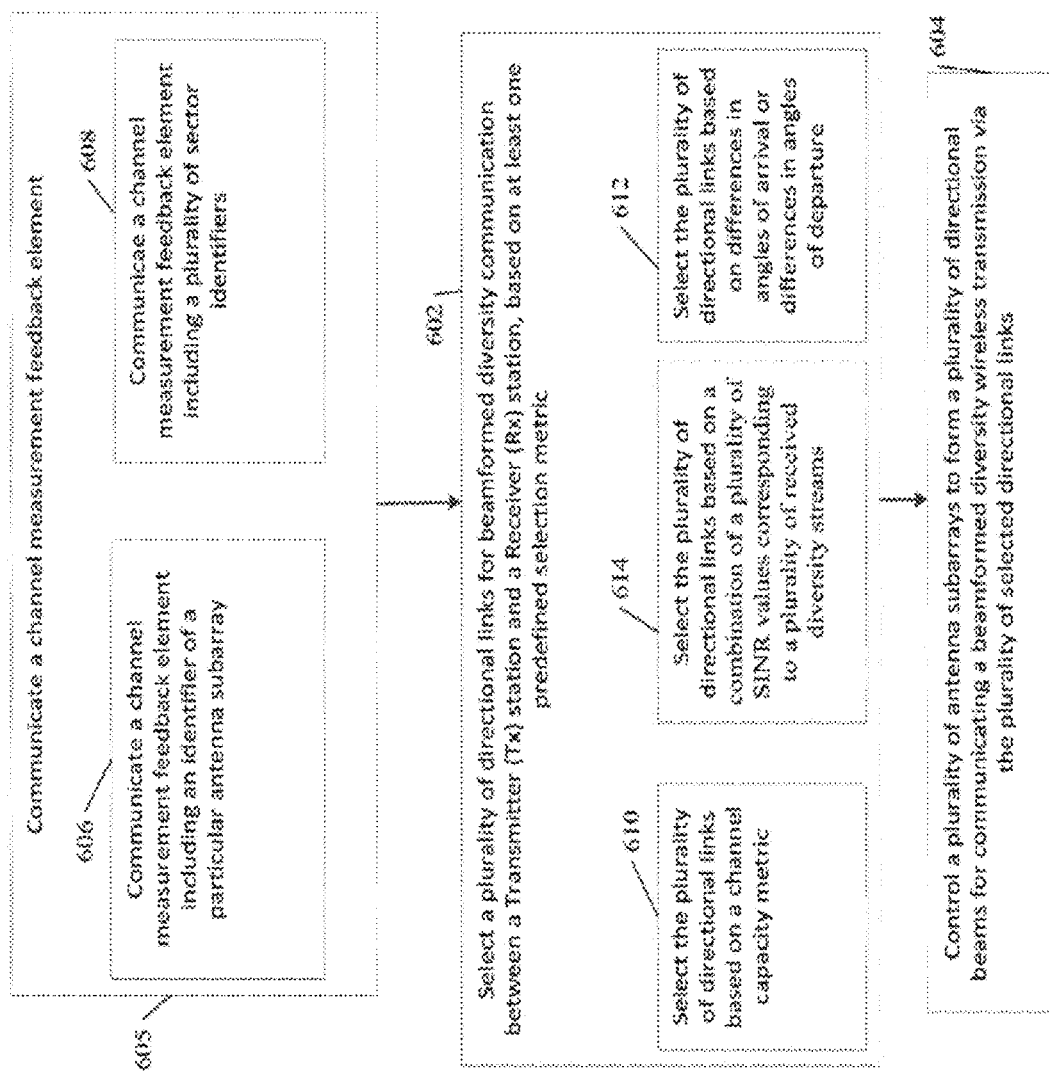
FIG. 6 is a schematic flow-chart illustration of a method of beamformed diversity wireless communication, in accordance with some embodiments.

Reference is made to FIG. 6, which schematically illustrates a method of beamformed diversity wireless communication, in accordance with some embodiments. In some embodiments, one or more of the operations of the method of FIG. 6 may be performed by a wireless communication system, e.g., system 100 (FIG. 1); a wireless communication device, e.g., devices 102 and/or 104 (FIG. 1); a baseband, e.g., baseband 150 (FIG. 1); a controller, e.g., controller 122 (FIG. 1), and/or a wireless communication unit, e.g., wireless communication units 110 and/or 120 (FIG. 1).

As indicated at block 602, the method may include selecting a plurality of directional links for beamformed diversity communication between a Transmitter (Tx) station and a Receiver (Rx) station, based on at least one predefined performance metric. For example, controller 122 (FIG. 1) may select the plurality of directional links for MIMO communication between devices 102 (FIG. 1) and 104 (FIG. 1), based on the performance metric C, e.g., as described above.

As indicated at block 604, the method may include controlling a plurality of antenna subarrays to form a plurality of directional beams for communicating a beamformed diversity wireless transmission via the plurality of selected directional links. For example, controller 122 (FIG. 1) may controller antenna subarrays 135 and 145 (FIG. 1) to form directional beams 137 and 147 (FIG. 1) for communicating the MIMO wireless transmission via the plurality of selected directional links, e.g., as described above.

In some embodiments, the directional links may be selected based on channel measurement feedback communicated between the TX and Rx sides.

As indicated at block 605, the method may include communicating a channel measurement feedback element. For example, wireless communication unit 110 (FIG. 1) may communicate the channel measurement feedback element to device 104 (FIG. 1), e.g., as described above.

As indicated at block 606, the method may include communicating the channel measurement feedback element including an identifier of a particular antenna subarray and one or more measurements corresponding to the particular antenna subarray. For example, wireless communication unit 110 (FIG. 1) may communicate beam refinement element 300 (FIG. 3) including field 302 (FIG. 3) representing an antenna subarray of antenna subarrays 135 and 145 (FIG. 1), and one or more measurements corresponding to the antenna subarray identified by field 302 (FIG. 3), e.g., as described above.

As indicated at block 608, the method may include communicating the channel measurement feedback element including a plurality of sector identifiers, each sector identifier identifying an antenna subarray and a sector corresponding to the antenna subarray, and a plurality of measurements corresponding to the plurality of sector identifiers. For example, wireless communication unit 110 (FIG. 1) may communicate channel measurement feedback element 400 (FIG. 4) including plurality of sector identifiers, e.g., in subfield 408, and a plurality of measurements, for example, in subfields 402, 404 and 408 (FIG. 4), corresponding to the plurality of sector identifiers, e.g., as described above.

As indicated at block 610, the method may include selecting the plurality of directional links for the beamformed diversity communication based on a channel capacity metric. For example, controller 122 (FIG. 1) may select the plurality of directional links for MIMO communication between devices 102 (FIG. 1) and 104 (FIG. 1), based on the channel capacity metric, e.g., as described above.

As indicated at block 612, the method may include selecting the plurality of directional links for the beamformed diversity communication based on differences in angles of arrival and/or differences in angles of departure. For example, controller 122 (FIG. 1) may select the plurality of directional links for MIMO communication between devices 102 (FIG. 1) and 104 (FIG. 1), based on differences in angles of arrival or differences in angles of departure of the N directional links 205 (FIG. 2), e.g., as described above.

As indicated at block 614, the method may include selecting the plurality of directional links for the beamformed diversity communication based on a combination of a plurality of SINR values corresponding to a plurality of received diversity streams. For example, controller 122 (FIG. 1) may select the plurality of directional links for MIMO communication between devices 102 (FIG. 1) and 104 (FIG. 1), based on a combination of a plurality of SINR values of a particular directional link of the N directional links 205 (FIG. 2) corresponding to a plurality of received MIMO streams of the particular directional link, e.g., as described above.

Some embodiments are based on recognition that complexity of the typical assignment solution depends only on the number of wireless devises to be assigned to different wireless communication channels. In those assignment solutions, the performance of the assignment remains constant regardless of the number of the assignments. However, some embodiments are based on realization that performance of the assignment of different communication channels to multiple wireless devices can be allowed to vary for different communication applications. For example, the optimality of the assignment can be balanced against the complexity of computations. In such a manner, the complexity of the assignment can be adapted to different situations.

Some embodiments are based on realization that such an adaptation of the assignment can be achieved with greedy optimization with adaptable relaxation parameter. A greedy optimization is a paradigm that follows the problem solving heuristic of making the locally optimal choice at each stage with the hope of finding a global optimum. However, the relaxation parameter applied to the greedy optimization allows to preserve at least some suboptimal choices at each stage of the greedy optimization. The number of suboptimal choices governed by the value of the relaxation parameter can vary for different application allowing to adapt the greedy optimization based on the complexity of the assignment problem. For example, the value of relaxation parameter can be selected based on a computational power of a controller performing the assignment and/or based on a number of the wireless devices to be assigned.

Figure 7:
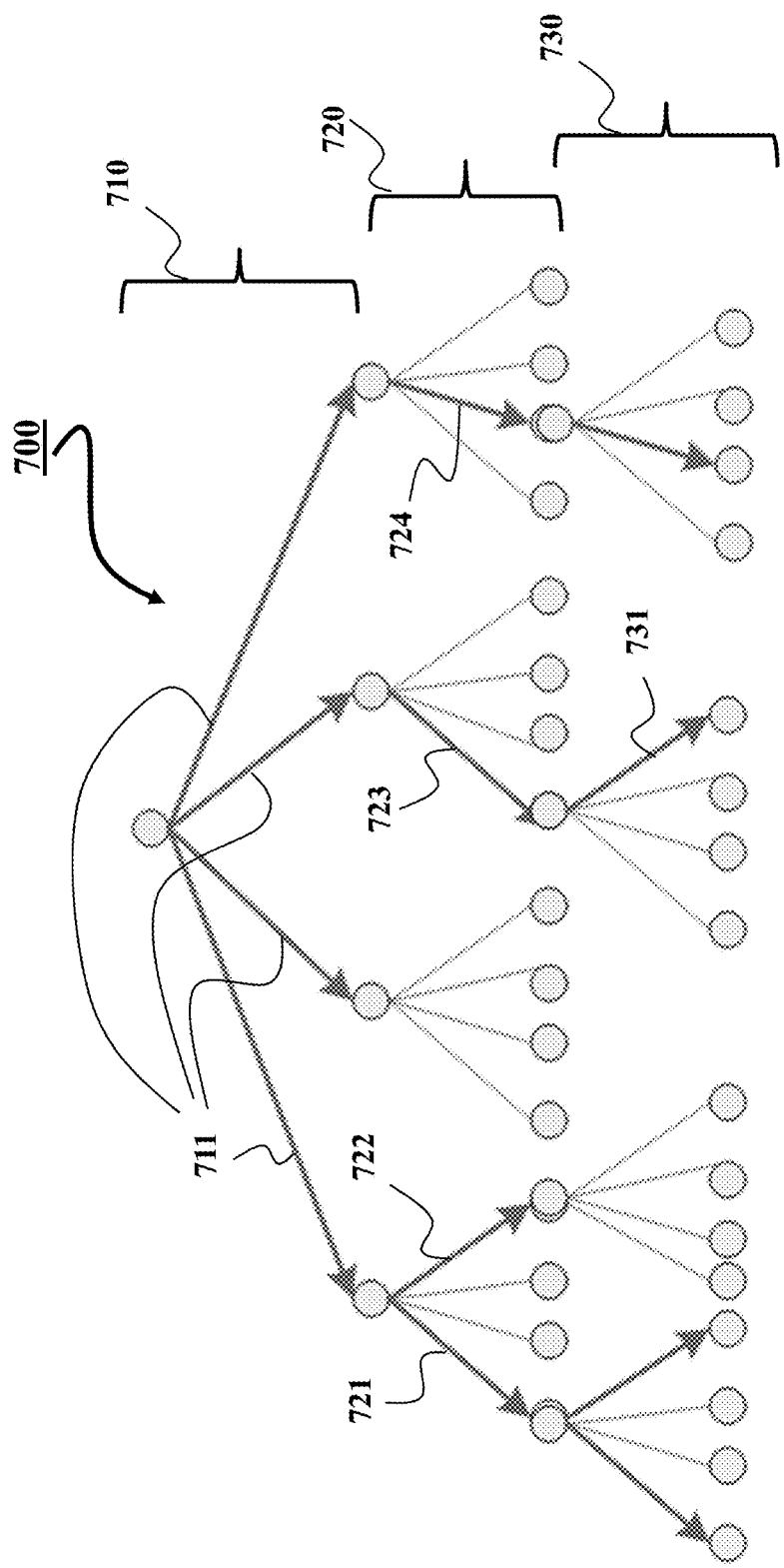
FIG. 7 is a schematic of a tree structure of greedy optimization with relaxation parameter, in accordance with some embodiments.

FIG. 7 shows a schematic of greedy optimization with adaptable relaxation parameters used by some embodiments. A number of assignment choices preserved at some stage of the greedy optimization equals the value of the relaxation parameter M to form an M-best set of assignment combinations. The assignment choices are preserved based on a performance metric of the assignment combinations formed with the preserved assignment choices.

Various embodiments select the value M for the greedy optimization based on a computational power of the controller. The greater value of M results in the greater computation. Additionally, or alternatively, the value M for the greedy optimization can be selected based on a number of the second wireless communication devices. For example, in one embodiment, the value M for the greedy optimization is proportional to a number of the second wireless communication devices. For example, the proportionality between the value M for the greedy optimization and the number of the second wireless communication devices can be linear or non-linear. Another example is to use the value M in proportion to the number of subarrays and the number of the second wireless communication devices.

FIG. 7 shows a schematic of a tree structure 700 of greedy optimization with relaxation parameter M=4 and three sub-array of antennas. Bold lines denote the survivor paths by means of the greedy optimization. The number of stages is the same as the number of antenna subarrays, so that there are three stages. At each stage 710, 720, and 730, the accumulated performance metric is computed for all available paths, and then only M paths, i.e., assignment combinations are selected that have greater performance metric among all the paths.

In the first stage 710, because there are only four paths for four potential assignments, all the paths 711 are selected as survivor paths. At the second stage 720, the further computations of the performance metric distances only computed from the survivor paths. That is, there are sixteen accumulated performance metrics corresponding to all paths, so only four survivor paths 721, 722, 723 and 724 are selected in the second stage. At the third stage 730, the greedy optimization method selects the path, e.g., 731, which has the maximum performance metric.

Some embodiments are based on realization that greedy optimization with adaptable relaxation parameters can be further improved by considering only possible assignments at each stage of the greedy optimization. This embodiment is based on recognition that in each combination of the assignments, if the wireless device is assigned to a wireless channel at one stage of the greedy optimization, the assignments or reassignments to the same wireless channel is not possible in subsequent stages of the greedy optimization. In such a manner, the complexity of the greedy optimization for assignment wireless channels is further reduced.

Figure 8:
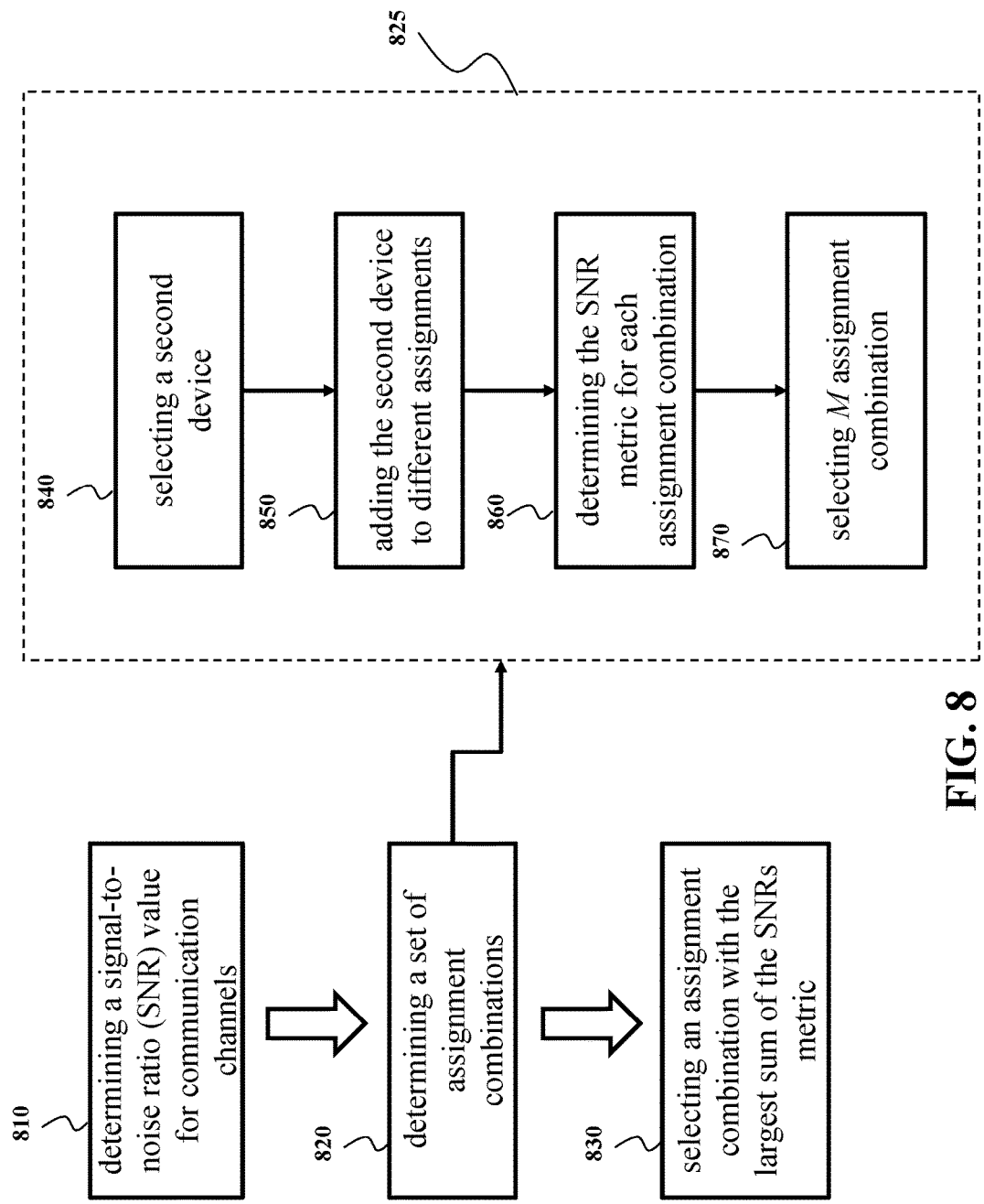
FIG. 8 is a block diagram of a method for multi-user assignment using greedy optimization, in accordance with some embodiments.

FIG. 8 shows a block diagram of a method for multi-user assignment using greedy optimization according to one embodiment. The embodiment determines 810 a signal-to-noise ratio (SNR) value for communication channels connecting each second wireless communication device with each subarray of antennas. In this embodiment, the performance metric is an SNR metric of each assignment combination determined as a function of SNR values of communication channels in the assignment combination. In such a manner, the data rate of the transmission according to the assignment can be increased. Examples of the SNR metric includes $$SNR_u = \frac{\text{trace}((H_u)^H H_u)}{\sigma^2}$$

wherein $H_u$ a channel matrix of the uth link.

The embodiment iteratively determines 820 a set of assignment combinations, until a termination condition is met. The embodiment, at each or at least one iteration 825, selects 840 a second wireless communication device from the set of second wireless communication devices, combines 850 the set of assignment combinations determined during a previous iteration with each possible assignment of the second wireless communication device to different subarrays of antennas to produce an extended set of assignment combinations.

In such a manner, different assignment of the selected second device can be tested with different previously determined assignments. The quality of those assignments can be determined according to the SNR metric. To that end, the embodiment determines 860 the SNR metric for each assignment combination in the extended set of assignment combinations.

Next, the embodiment selects 870, from the extended set of assignment combinations, a subset of assignment combinations to be used as the set of assignment combinations at a subsequent iteration. Each assignment combination in the subset has the SNR metric equals or greater than the SNR metric of an assignment combination remaining in the extended set. The maximal size of the subset is the same for all iterations and equals the relaxation parameter M.

After the termination condition is met, the embodiment selects 830 an assignment combination from the set of assignment combinations with the largest sum of the SNRs metric.

Figure 9:
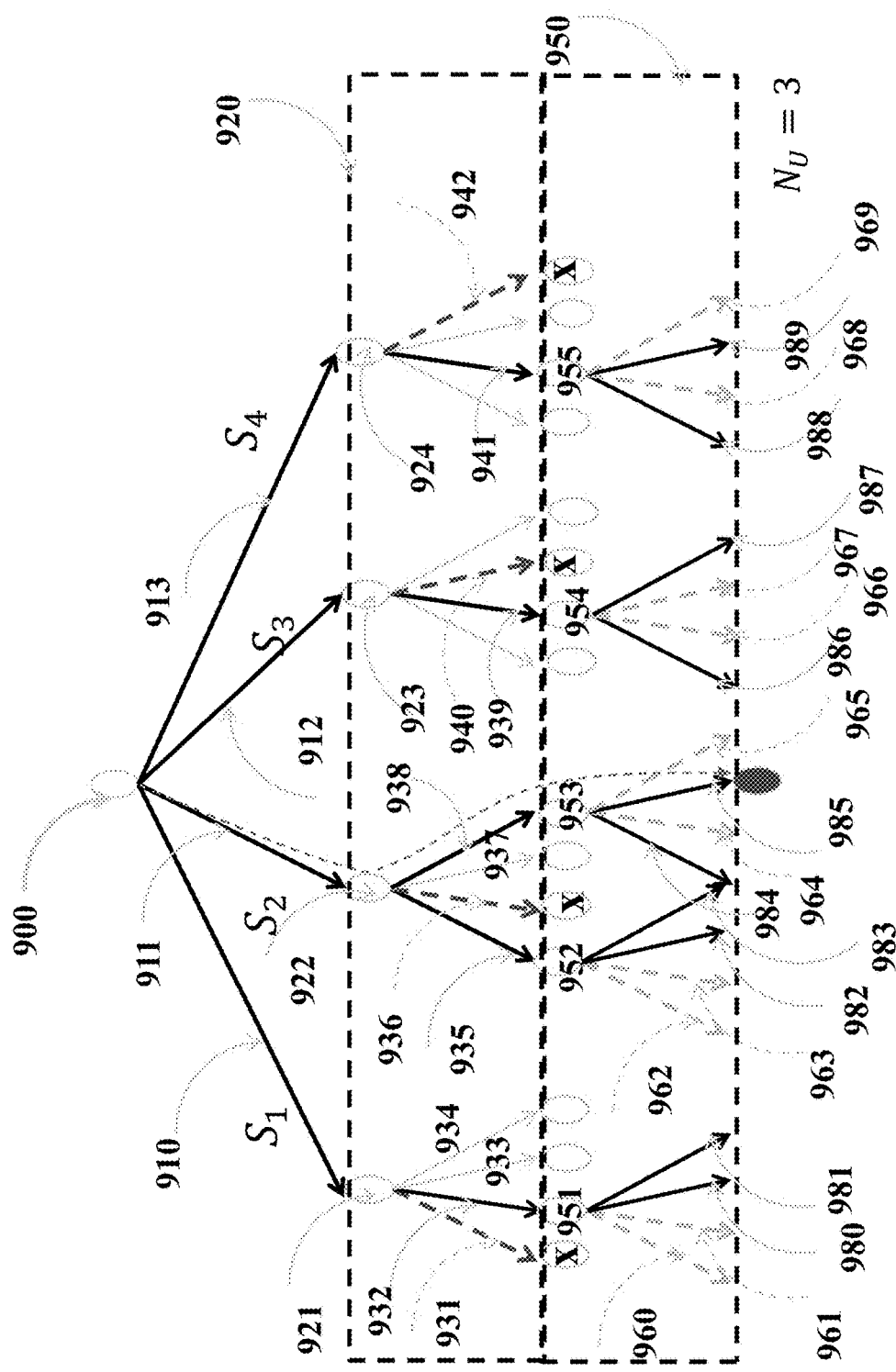
FIG. 9 is a schematic of an example illustrating the performance of the method of FIG. 8.

FIG. 9 shows a schematic of an example illustrating the performance of the method of FIG. 8. FIG. 9 shows one example of with number of subarrays: S=4, number of second devices: Nu=3, and relaxation parameter: M=5.

The greedy optimization performs the assignment on an M-based tree graph. At the root node (900), there are four branches (910, 911, 912, and 913), where each branch corresponds to a subarray. For each subarray, the embodiment computes the SNR metric, $$SNR_u = \frac{\text{trace}((H_u)^H H_u)}{\sigma^2},$$

or the rate metric, $R_u = \log_2(1+SNR_u), \forall u$. During the first stage, the second devices are assigned to different antenna subarrays.

At the first stage, the number of antenna subarrays is less than relaxation parameter M. Thus, the greedy optimization preserves all the branches (910-913). In the second stage (920), there are four nodes (921, 922, 923, and 924). At each node, for example, node 921, there are four branches, (931-934), with each branch corresponds to a subarray. Branch 931 is for subarray S1, and branch 934 is for subarray S4. Similarly, node 922 has four branches (935-938). As for node 921, branch 935 and 938 represent subarray S1 and subarray S4, respectively. To avoid collision between devices, only one device is assigned at each subarray, so that at node 921, branch 931 is not able to be used since branch 910 which is representing subarray S1 is selected in the first stage. Similarly, branches 936, 940, and 942 are impossible in the second stage. For the remaining branches, the embodiment determines the SNR metric or rate metric for the current extended set of the assignment combinations. Suppose that branches 932, 935, 938, 939, and 941 have the biggest five sum of the SNRs, equivalently sum of the rates, among 12 branches, then these branches are maintained for the next stage, stage 3, of the computation. To that end, the branches 932, 935, 938, 939, and 941 form a subset of assignment combinations selected from the extended set of assignment combinations at the second stage, i.e., iteration, of the greedy optimization.

At the third stage (950), there are five nodes (951,952, 953,954, and 955). For node 951, two branches (960 and 961) are possible since subarray 1 and subarray 2 are already assigned in stage 1 and stage 2. Similarly, branches 966 and 967 are not possible since subarray 3 and subarray 2 are already assigned in stage 1 and stage 2, respectively. For a set of usable branches, 980-989, the embodiment determines the accumulated SNR metric or rate metric for the stage 3.

The third stage is the last stage, so the termination condition is reached, the greedy optimization stops its iterations, and the embodiment selects one branch (985) that has the maximum accumulated SNR metric or rate metric. This assignment combination has the greatest sum of the SNRs metric or sum of the rates metric and the path itself can be traced back from the bottom to the top through the branches 911, 938, 985. To that end, the selected path assigns the second device 1 to the second subarray, assigns the second device 2 to the third subarray, and assigns the second device 3 to the third subarray. By using this method, a complexity reduced greedy optimization with avoiding collision between devices can be implemented.

Figure 10:
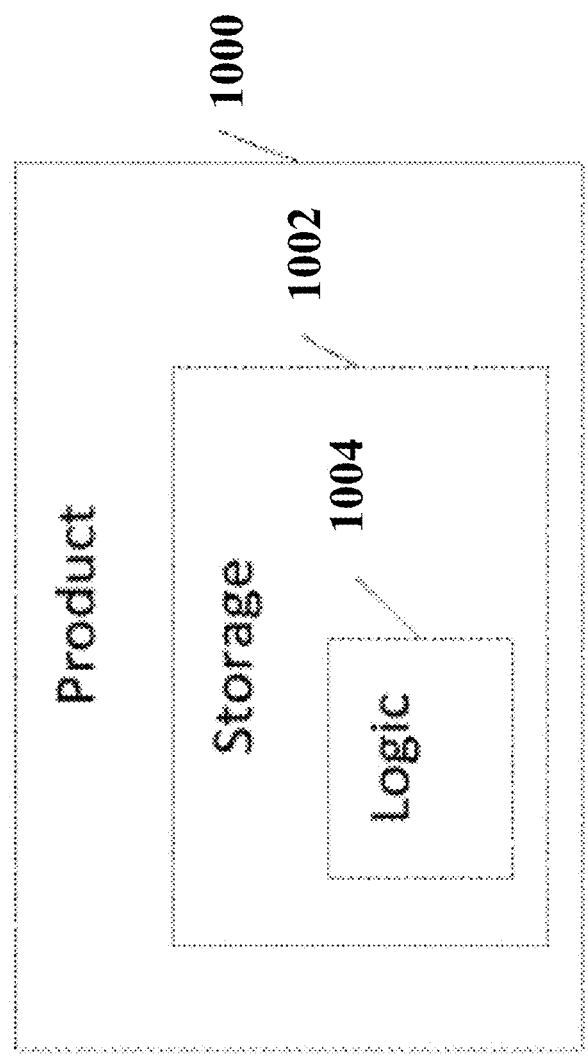
FIG. 10 is a schematic illustration of a product of manufacture, in accordance with some embodiments.

FIG. 10 schematically illustrates a product of manufacture 1000, in accordance with some embodiments. Product 1000 may include a non-transitory machine-readable storage medium 1002 to store logic 1004, which may be used, for example, to perform at least part of the functionality of device 102 (FIG. 1), device 104 (FIG. 1), wireless communication unit 110 (FIG. 1), wireless communication unit 120 (FIG. 1), and/or controller 122 (FIG. 1) and/or to perform one or more operations of the methods described herein. The phrase "non-transitory machine-readable medium" is directed to include all computer-readable media, with the sole exception being a transitory propagating signal.

In some embodiments, product 1000 and/or machine-readable storage medium 1002 may include one or more types of computer-readable storage media capable of storing data, including volatile memory, non-volatile memory, removable or non-removable memory, erasable or non-erasable memory, writeable or re-writeable memory, and the like. For example, machine-readable storage medium 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A wireless communication system, comprising:
a controller configured to control a plurality of antenna subarrays of a first wireless communication device to form a plurality of directional beams to communicate a beamformed diversity wireless transmission between the first wireless communication device and a set of second wireless communication devices over a plurality of communication channels, wherein the controller assigns at least some antenna subarrays to at least some second wireless communication devices using a greedy optimization with a relaxation parameter M and controls the plurality of antenna subarrays according to the assignment, wherein a number of assignment choices preserved at some stage of the greedy optimization equals the value of the relaxation parameter M to form an M-best set of assignment combinations, and wherein the assignment choices are preserved, avoiding collision in the beamformed diversity wireless transmission between the first wireless communication device and each second wireless communication device in the set of second wireless communication device, based on a total performance metric of the assignment combinations formed with the preserved assignment choices.

2. The system of claim 1, wherein the performance metric includes one or a combination of a channel capacity metric, a rate for each communication channel in an assignment combination, a signal-to-noise ratio (SNR) value for each communication channel in the assignment combination, and a signal-to-interference-plus-noise-ratio (SINR) value for each communication channel in the assignment combination.

3. The system of claim 1, wherein the value M for the greedy optimization is selected based on a computational power of the controller.

4. The system of claim 1, wherein the value M for the greedy optimization is selected based on a number of the second wireless communication devices.

5. The system of claim 1, wherein the value M for the greedy optimization is proportional to at least one or a combination of a number of the second wireless communication devices and a number of the antenna subarrays.

6. The system of claim 5, wherein the proportionality between the value M for the greedy optimization and the number of the second wireless communication devices is non-linear.

7. The system of claim 1, wherein the controller is further configured to:
    determine a signal-to-noise ratio (SNR) value for the communication channels connecting each second wireless communication device with each subarray of the antenna subarrays;
    determine a set of assignment combinations, wherein an SNR metric of each assignment combination is a function of SNR values of the communication channels in the assignment combination, wherein the set of assignment combinations is determined iteratively until a termination condition is met, wherein an iteration comprises:
    select a second wireless communication device from the set of second wireless communication devices;
    combine the set of assignment combinations determined during a previous iteration with each possible assignment of the second wireless communication device to different subarrays of the antenna subarrays to produce an extended set of assignment combinations;
    determine the SNR metric for each assignment combination in the extended set of assignment combinations;
    select, from the extended set of assignment combinations, a subset of assignment combinations to be used as the set of assignment combinations at a subsequent iteration, wherein each assignment combination in the subset of assignment combinations has the SNR metric equals or greater than the SNR metric of an assignment combination remaining in the extended set of assignment combinations, wherein the maximal size of the subset of assignment combinations is the same for all iterations;
    select an assignment combination from the set of assignment combinations with the largest sum of the SNR metric; and
    transmit data from a set of subarrays of the antenna subarrays to the set of second wireless communication devices according the selected assignment combination.

8. The system of claim 1, wherein the beamformed diversity wireless transmission comprises a transmission over one or a combination of a millimeter wave (mmWave) channel and a directional multi-gigabit (DMG) channel.

9. The system of claim 1, further comprising:
    one or more antenna arrays controllable as the plurality of antenna subarrays; and
    a plurality of Radio Frequency (RF) chains coupled to the plurality of antenna subarrays and the controller, such that the controller controls the plurality of antenna subarrays through the RF chains.

10. A method for beamformed diversity wireless transmission between a first wireless communication device and a set of second wireless communication devices over a plurality of communication channels, wherein the method uses a processor coupled with stored instructions implementing the method, wherein the instructions, when executed by the processor carry out at least some steps of the method, comprising:
    determining an assignment combination between a plurality of antenna subarrays of the first wireless communication device and the set of second wireless communication devices using a greedy optimization with a relaxation parameter M optimizing a performance metric of the beamformed diversity wireless transmission; and
    controlling the plurality of antenna subarrays of the first wireless communication device to form a plurality of directional beams to communicate the beamformed diversity wireless transmission between the first wireless communication device and the set of second wireless communication devices according to the assignment combination, wherein a number of assignment choices preserved at some stage of the greedy optimization equals the value of the relaxation parameter M to form an M-best set of assignment combinations, and wherein the assignment choices are preserved based on a total performance metric of the assignment combinations formed with the preserved assignment choices.

11. The method of claim 10, wherein the performance metric includes one or a combination of a channel capacity metric, a signal-to-noise ratio (SNR) value for each communication channel in the assignment combination, and a signal-to-interference-plus-noise-ratio (SINR) value for each communication channel in the assignment combination.

12. The method of claim 10, wherein the value M for the greedy optimization is selected based on a computational power of the processor.

13. The method of claim 10, wherein the value M for the greedy optimization is selected based on a number of the second wireless communication devices.

14. The method of claim 10, wherein the value M for the greedy optimization is proportional to at least one or a combination of a number of the second wireless communication devices and a number of the antenna subarrays.

15. The method of claim 14, wherein the proportionality between the value M for the greedy optimization and the number of the second wireless communication devices is non-linear.

16. The method of claim 10, wherein determining the assignment combination comprises:
    determining a signal-to-noise ratio (SNR) value for the communication channels connecting each second wireless communication device with each subarray of the antenna subarrays;
    determining a set of assignment combinations, wherein an SNR metric of each assignment combination is a function of SNR values of the communication channels in the assignment combination, wherein the set of assignment combinations is determined iteratively until a termination condition is met, wherein an iteration comprises:
    selecting a second wireless communication device from the set of second wireless communication devices;
    combining the set of assignment combinations determined during a previous iteration with each possible assignment of the second wireless communication device to different subarrays of the antenna subarrays to produce an extended set of assignment combinations;

determining the SNR metric for each assignment combination in the extended set of assignment combinations;

selecting, from the extended set of assignment combinations, a subset of assignment combinations to be used as the set of assignment combinations at a subsequent iteration, wherein each assignment combination in the subset of assignment combinations has the SNR metric equals or greater than the SNR metric of an assignment combination remaining in the extended set of assignment combinations, wherein the maximal size of the subset of assignment combinations is the same for all iterations; and selecting an assignment combination from the set of assignment combinations with the largest sum of the SNR metric.

17. A product comprising a non-transitory computer-readable storage medium storing instructions executed by a processor to perform the operation:

determining an assignment combination between a plurality of antenna subarrays of a first wireless communication device and a set of second wireless communication devices using a greedy optimization with a relaxation parameter optimizing a performance metric of a beamformed diversity wireless transmission, wherein determining the assignment combination comprises:

determining a signal-to-noise ratio (SNR) value for communication channels connecting each second wireless communication device with each subarray of the antenna subarrays;

determining a set of assignment combinations, wherein an SNR metric of each assignment combination is a function of SNR values of the communication channels in the assignment combination, wherein the set of assignment combinations is determined iteratively until a termination condition is met, wherein an iteration comprises:

selecting a second wireless communication device from the set of second wireless communication devices;

combining the set of assignment combinations determined during a previous iteration with each possible assignment of the second wireless communication device to different subarrays of the antenna subarrays to produce an extended set of assignment combinations;

determining the SNR metric for each assignment combination in the extended set of assignment combinations;

selecting, from the extended set of assignment combinations, a subset of assignment combinations to be used as the set of assignment combinations at a subsequent iteration, wherein each assignment combination in the subset of assignment combinations has the SNR metric equals or greater than the SNR metric of an assignment combination remaining in the extended set of assignment combinations, wherein the maximal size of the subset of assignment combinations is the same for all iterations; and selecting an assignment combination from the set of assignment combinations with the largest sum of the SNR metric; and controlling the plurality of antenna subarrays of the first wireless communication device to form a plurality of directional beams to communicate the beamformed diversity wireless transmission between the first wireless communication device and the set of second wireless communication devices according to the assignment combination.

* * * * *